(12) United States Patent
Kondo et al.

(10) Patent No.: US 9,228,465 B2
(45) Date of Patent: Jan. 5, 2016

(54) CATALYST PROTECTION DEVICE AND CATALYST PROTECTION METHOD FOR INTERNAL COMBUSTION ENGINE

(71) Applicants: Shinya Kondo, Gotenba (JP); Yasuyuki Takama, Gotenba (JP); Koji Aso, Susono (JP)

(72) Inventors: Shinya Kondo, Gotenba (JP); Yasuyuki Takama, Gotenba (JP); Koji Aso, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/404,137

(22) PCT Filed: May 30, 2013

(86) PCT No.: PCT/IB2013/001200
§ 371 (c)(1),
(2) Date: Nov. 26, 2014

(87) PCT Pub. No.: WO2013/179131
PCT Pub. Date: Dec. 5, 2013

(65) Prior Publication Data
US 2015/0135682 A1    May 21, 2015

(30) Foreign Application Priority Data
Jun. 1, 2012   (JP) ................. 2012-126030

(51) Int. Cl.
*F01N 3/00*  (2006.01)
*F01N 3/20*  (2006.01)
*F02D 41/02* (2006.01)
*F01N 11/00* (2006.01)

(52) U.S. Cl.
CPC ............ *F01N 3/2033* (2013.01); *F01N 3/2066* (2013.01); *F01N 11/002* (2013.01); *F02D 41/0235* (2013.01); *F01N 2900/1602* (2013.01); *F02D 2041/0265* (2013.01); *F02D 2200/0802* (2013.01); *Y02T 10/47* (2013.01)

(58) Field of Classification Search
CPC ................... F02D 41/0235; F02D 2041/0265; F01N 11/002; F01N 3/2066; F01N 3/2033; F01N 2900/1602; F01D 2200/0802
USPC .......................................................... 60/274
See application file for complete search history.

(56) References Cited

U.S. PATENT DOCUMENTS

| 5,884,477 | A |   | 3/1999 | Andou et al. |
|---|---|---|---|---|
| 2011/0251779 | A1 | * | 10/2011 | Kachi ....................... F01N 3/20 701/103 |
| 2012/0014410 | A1 | * | 1/2012 | Kachi ................... F01N 11/005 374/144 |
| 2015/0128567 | A1 | * | 5/2015 | Kondo ................. F01N 3/2066 60/274 |

FOREIGN PATENT DOCUMENTS

| DE | 19801976 A1 | * | 8/1998 | ............. F01N 9/005 |
|---|---|---|---|---|
| JP | 07-166918 A |   | 6/1995 | |

(Continued)

*Primary Examiner* — Jason Shanske
(74) *Attorney, Agent, or Firm* — Kenyon & Kenyon LLP

(57) ABSTRACT

A catalyst protection device includes: a catalyst provided in an exhaust system of an internal combustion engine; a bed temperature acquisition unit that acquires a bed temperature for each of a plurality of regions of the catalyst distributed in an exhaust gas flow direction; and a fuel injection unit that determines for each of the regions whether an increase in fuel injection amount is required on the basis of the corresponding bed temperature acquired by the bed temperature acquisition unit, that calculates an increase in fuel injection amount for each region and that injects fuel of an amount including the sum of the calculated increase values.

6 Claims, 11 Drawing Sheets

(56) References Cited

FOREIGN PATENT DOCUMENTS

| JP | 10-205375 A | 8/1998 |
| JP | 2003-503622 A | 1/2003 |
| JP | 2003-343242 A | 12/2003 |
| JP | 2008-223679 A | 9/2008 |
| JP | 2013-249792 A | 12/2013 |
| WO | 2013/179132 A1 | 12/2013 |

* cited by examiner

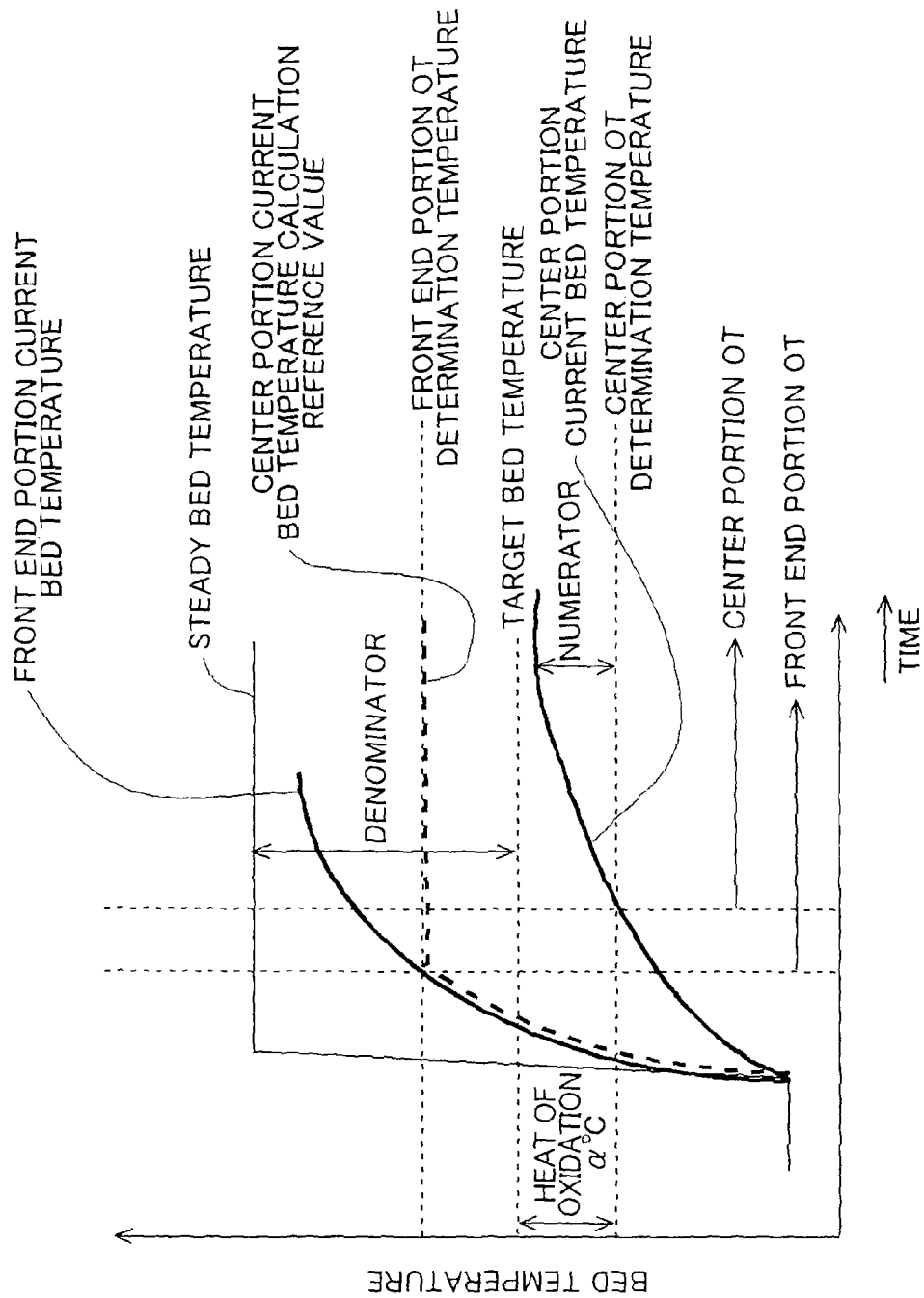

CATALYST PROTECTION DEVICE AND CATALYST PROTECTION METHOD FOR INTERNAL COMBUSTION ENGINE

CROSS-REFERENCE TO RELATED APPLICATIONS

This is a national phase application based on the PCT International Patent Application No. PCT/IB2013/001200 filed May 30, 2013, claiming priority to Japanese Patent Application No. 2012-126030 filed Jun. 1, 2012, the entire contents of both of which are incorporated herein by reference.

BACKGROUND OF THE INVENTION

1. Field of the Invention

The invention relates to a catalyst protection device and catalyst protection method for an internal combustion engine.

2. Description of Related Art

Some internal combustion engines (engines) include an exhaust purification catalyst (hereinafter, simply referred to as catalyst where appropriate) for purifying exhaust gas. However, when the catalyst is excessively heated by high-temperature exhaust gas, or the like, the purification capacity of the catalyst may decrease. In order to keep the high purification capacity of the catalyst, a technique for cooling the catalyst by decreasing the temperature of exhaust gas with the use of the heat of vaporization of fuel through an increase in fuel injection amount, may be used. The increase in the amount of injected fuel in this case is termed over-temperature protection (OT) increase. The amount of injected fuel that is increased through the OT increase is termed OT increase value.

Japanese Patent Application Publication No. 10-205375 (JP 10-205375 A) describes a fuel supply control system in which, when a high-load operating state of an internal combustion engine is detected and an estimated temperature of an exhaust control device is higher than or equal to a predetermined temperature, the amount of fuel that is supplied to the internal combustion engine is increased.

Incidentally, the distribution of temperature in the catalyst included in the exhaust control device varies in an exhaust gas flow direction. In addition, it is presumable that a temperature state at the upstream side of the catalyst in the exhaust gas flow direction propagates to the downstream side of the catalyst in the exhaust gas flow direction. However, in JP 10-205375 A, such a temperature distribution in the exhaust gas flow direction in the catalyst is not considered. As a result, the exhaust control device may partially enter an excessive-temperature state.

SUMMARY OF THE INVENTION

The invention provides a catalyst protection device and a catalyst protection method that appropriately perform OT increase in accordance with an actual temperature distribution in a catalyst.

A first aspect of the invention provides a catalyst protection device for an internal combustion engine. The catalyst protection device includes: a catalyst that purifies exhaust gas; a bed temperature acquisition unit configured to acquire a bed temperature of the catalyst for each of a plurality of regions of the catalyst in an exhaust gas flow direction; and a fuel injection unit configure to, when it is determined that an increase in fuel injection amount is required for each of the regions on the basis of the corresponding bed temperatures, inject fuel including the sum of increase values required for the respective regions.

The temperature of a region at a downstream side of the catalyst in the exhaust gas flow direction may be higher than the temperature of an upstream side of the downstream-side region due to heat propagation, or the like. The first aspect of the invention increases a fuel injection amount on the basis of a temperature state acquired for each of the plurality of regions. Thus, the first aspect of invention is able to protect the catalyst by appropriately cooling the catalyst in accordance with an actual temperature distribution in the catalyst.

In the catalyst protection device according to the first aspect of the invention, on the basis of determination as to whether an increase in fuel injection amount is required for a preset reference region and determination as to whether an increase in fuel injection amount is required for a region upstream of the reference region in the exhaust gas flow direction among the plurality of regions, the fuel injection unit may be configured to add an increase value for the reference region to an increase value for the region upstream of the reference region in the exhaust gas flow direction.

In the catalyst protection device according to the first aspect of the invention, when it is determined that an increase in fuel injection amount is required for both the reference region and an adjacent region upstream of the reference region in the exhaust gas flow direction, the fuel injection unit may be configured to add an increase value for the reference region to an increase value for the adjacent region upstream of the reference region in the exhaust gas flow direction.

For example, when the internal combustion engine enters an accelerating state or the heat of oxidation reaction of an oxygen storage capacity (OSC) agent is generated in the region at the upstream side of the catalyst in the exhaust gas flow direction, the Temperature of the downstream-side region of the catalyst in the exhaust gas flow direction (preset reference region) increases. On the other hand, when the region at the upstream side of the catalyst in the exhaust gas flow direction is not in an over-temperature state, it is presumable that the internal combustion engine is in a stoichiometric state or in a steady travel state. Thus, there is a low probability that the region at the downstream side of the catalyst in the exhaust gas flow direction (reference region) becomes an over temperature state. Then, when it is determined that an increase in fuel injection amount is required for both the reference region and the adjacent region upstream of the reference region in the exhaust gas flow direction, fuel of an amount including a sum of fuel injection amount required for the adjacent region and the fuel increase amount required for the reference region is injected. That is, an increase in fuel injection amount in the case where cooling of the catalyst is not required is avoided, so an excessive rich state of fuel in the upstream-side region in the exhaust gas flow direction is suppressed, and a deviation from a range in which the excess air ratio $\lambda=1$ at the stoichiometric air-fuel ratio is suppressed. In addition, an excessive decrease in bed temperature for the upstream-side region in the exhaust gas flow direction is suppressed.

In the catalyst protection device according to the first aspect of the invention, when the bed temperature acquisition unit sets a determination value for each of the plurality of regions and then calculates the increase value for the reference region and the increase value for the region upstream of the reference region in the exhaust gas flow direction using the determination values respectively set for the regions, the bed temperature acquisition unit may be configured to acquire the bed temperature in the reference region on the basis of the determination value (threshold value for determining catalyst temperature) set for the region upstream of the reference region in the exhaust gas flow direction.

Each determination value is set in order to determine whether the corresponding region is in an excessive-temperature state. When the amount of injected fuel for the region at the upstream side of the catalyst in the exhaust gas flow direction is increased, a temperature decrease of the catalyst occurs in response to the increase in the amount of injected fuel. However, it is difficult to accurately acquire the rate of the temperature decrease. Then, the determination value set for the region at the upstream side of the catalyst in the exhaust gas flow direction is employed as the high-temperature-side strictest condition, and a temperature state in the reference region is acquired. Thus, it is possible to suppress damage to the catalyst due to a situation that the reference region enters an over temperature state.

In the catalyst protection device according to the first aspect of the invention, the fuel injection unit may set a value, as a determination value for the reference region among the plurality of regions, smaller than a determination value set for a region upstream of a reference region in the exhaust gas flow direction, and may determine for each of the regions whether an increase in fuel injection amount is required by comparing a current value of the bed temperature for each of the regions with the determination value set for each of the regions.

The temperature of the region at the downstream side of the catalyst in the exhaust gas flow direction may further increase due to, for example, heat propagation from the upstream side in the exhaust gas flow direction. Then, a value smaller than a determination value set for the region upstream of the reference region in the exhaust gas flow direction is set as a determination value for the reference region. Thus, it is possible to appropriately determine an over-temperature state in the reference region and to increase the amount of injected fuel.

A second aspect of the invention provides a catalyst protection method for an internal combustion engine. The catalyst protection method includes: acquiring a bed temperature of a catalyst, which purifies, exhaust gas, for each of a plurality of regions of the catalyst in an exhaust gas flow direction; after acquiring the bed temperature for each of the regions, determining for each of the plurality of regions whether an increase in fuel injection amount is required on the basis of the corresponding bed temperature; and, after the determination, when it is determined that an increase in fuel injection amount is required for each of the regions, injecting fuel of an amount including the sum of increase values required for the respective regions.

With the catalyst protection device and the catalyst protection method according to the aspects of the invention, it is possible to perform appropriate OT increase in accordance with an actual temperature distribution in a catalyst.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a graph that illustrates calculation of a correction coefficient for the center portion of the catalyst.

DETAILED DESCRIPTION OF EMBODIMENTS

An embodiment of the invention will be described with reference to the accompanying drawings.

Figure 1:
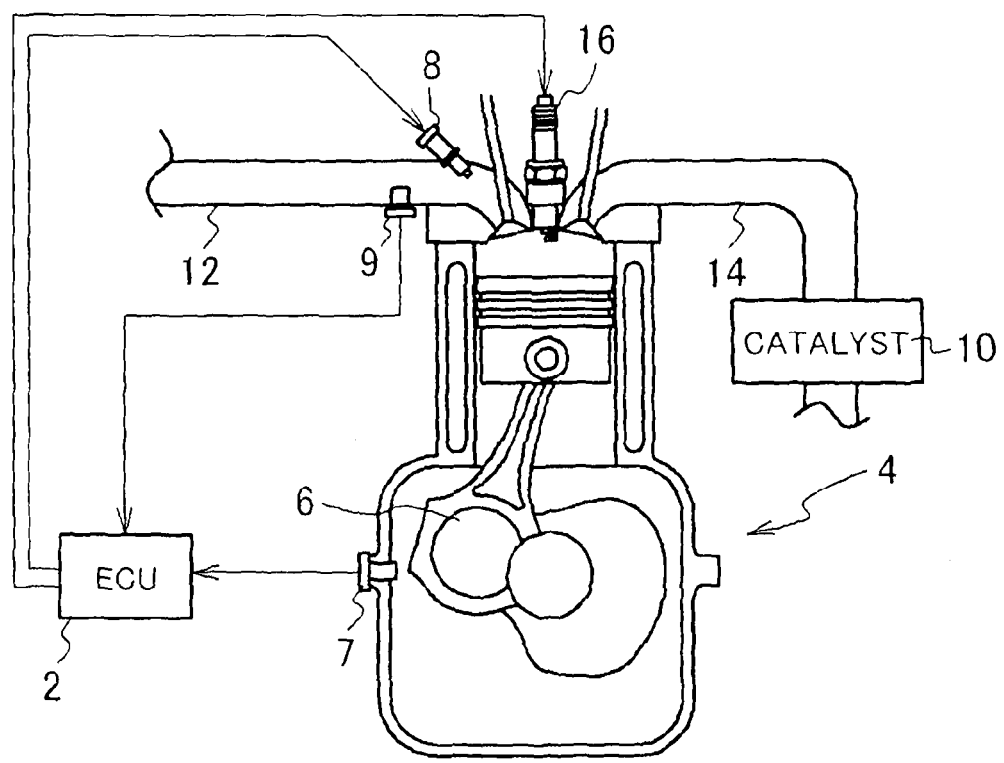
FIG. 1 is a schematic view that illustrates an engine to which a catalyst protection device according to an embodiment is applied.

First, the configuration of a catalyst protection device for an internal combustion engine (hereinafter, simply referred to as catalyst protection device) will be described. FIG. 1 is a schematic view that illustrates the internal combustion engine to which the catalyst protection device according to the embodiment is applied.

As shown in FIG. 1, the engine includes an engine control unit (ECU) 2, an engine body 4, a crankshaft 6, a crank angle sensor 7, a fuel injection valve 8, an intake air sensor 9, an exhaust purification catalyst (hereinafter, simply referred to as catalyst where appropriate) 10, an intake pipe 12, an exhaust pipe 14 and an ignition plug 16.

The fuel injection valve 8, the intake pipe 12, the exhaust pipe 14 and the ignition plug 16 are provided for the engine body 4. The crank angle sensor 7 is provided at a cylinder of the engine body 4, and detects the crank angle of the crankshaft 6. The fuel injection valve 8 and the intake air sensor 9 are provided at the intake pipe 12. The fuel injection valve 8 injects fuel. The intake air sensor 9 detects an intake air amount that is taken into the engine body 4 through the intake pipe 12. The catalyst 10 is provided in an exhaust system. Specifically, the catalyst 10 is provided at the exhaust pipe 14, and purifies exhaust gas that is emitted from the engine body 4. The ECU 2 acquires a data of a crank angle and an intake air amount. The crank angle is detected by the crank angle sensor 7. The intake air amount is detected by the intake air sensor 9. The ECU 2 controls injection of fuel injected by the fuel injection valve 8, and ignition performed by the ignition plug 16.

Figure 2:
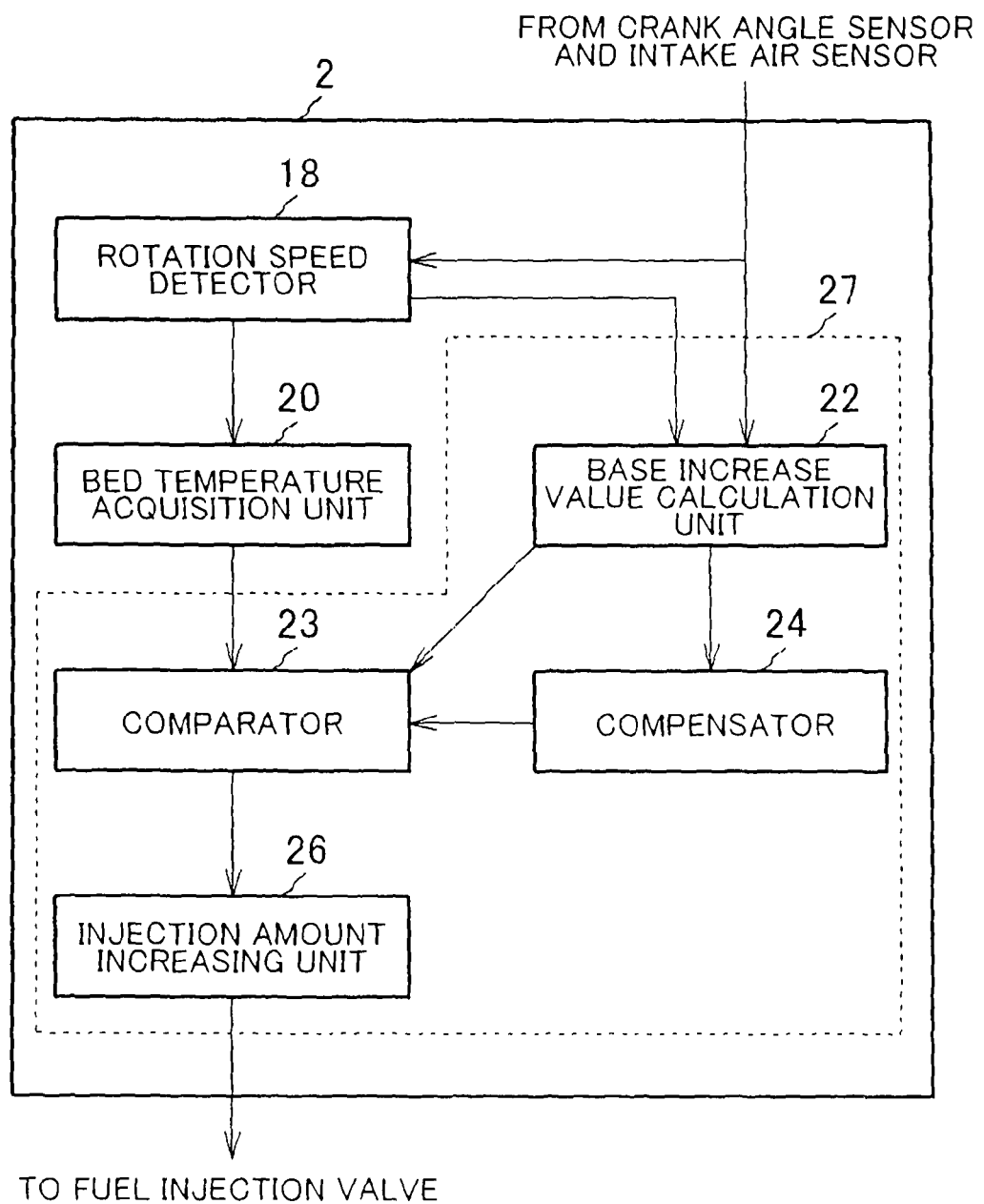
FIG. 2 is a functional block diagram that illustrates the catalyst protection device according to the embodiment.

FIG. 2 is a functional block diagram that illustrates a fuel injection control device according to the embodiment. As shown in FIG. 2, the ECU 2 functions as a rotation speed detector 18, a bed temperature acquisition unit 20 and a fuel injection unit 27. The fuel injection unit 27 includes a base increase value calculation unit 22, a comparator 23, a compensator 24 and an injection amount increasing unit 26. The ECU 2 holds a predetermined determination value (threshold value for determining catalyst), that is, the ECU 2 holds an OT determination temperature. The ECU 2 compares a current bed temperature with the OT determination temperature, and determines whether OT increase is required. The ECU 2 also holds a target bed temperature. The target bed temperature will be described in detail later.

Figure 3:
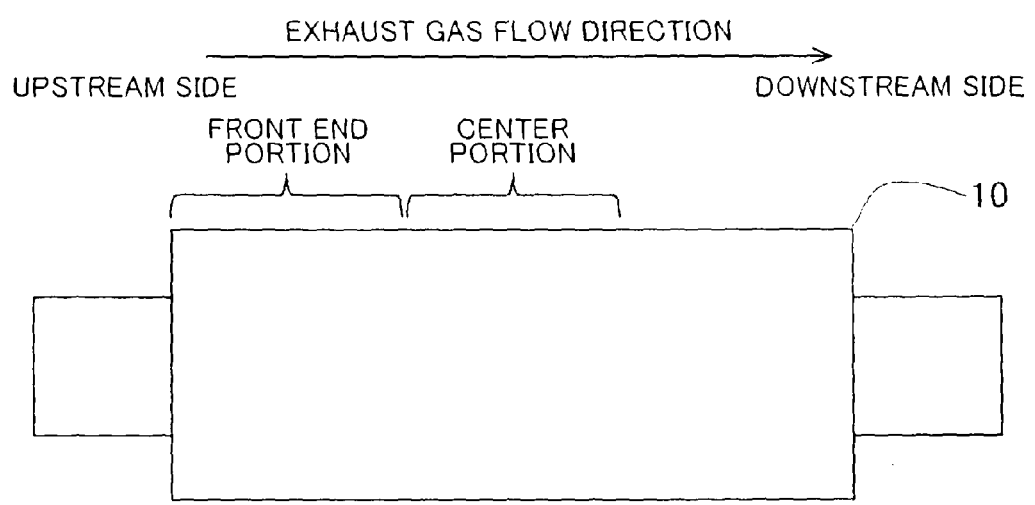
FIG. 3 is a view that illustrates a front end portion and a center portion in a catalyst.

As shown in FIG. 3, the catalyst 10 is distributed in an exhaust gas flow direction. That is, the catalyst 10 is distributed into a plurality of regions in the exhaust gas flow direction. Specifically, the catalyst 10 is distributed into a center portion and a front end portion that is a region upstream of the center portion in the exhaust gas flow direction. In the present embodiment, the center portion corresponds to a preset reference region (reference region). The front end portion corresponds to a region that is located upstream of the center portion in the exhaust gas flow direction. The catalyst 10 may be distributed into more number of regions. In this case, the center portion and the front end portion need not be adjacent to each other. In the present embodiment, the center portion and the front end portion are adjacent to each other. In addition, the front end portion and the center portion need not be strictly partitioned by a partition wall, or the like. The front end portion and the center portion just need to be identified as distributed regions. The injection amount increasing unit 26 increases the injection amount in consideration of an OT increase value. The OT increase value is calculated for each of the regions into which the catalyst 10 is distributed in the exhaust gas flow direction.

The rotation speed detector 18 acquires a crank angle, and detects a rotation speed on the basis of the crank angle. The crank angle is detected by the crank angle sensor 7. The bed temperature acquisition unit 20 acquires a steady bed temperature of the catalyst 10 and a current bed temperature of the catalyst 10 on the basis of the intake air amount and the rotation speed of the internal combustion engine. The intake air amount is detected by the intake air sensor 9. The rotation speed is detected by the rotation speed detector 18. The steady bed temperature is a temperature to which the bed temperature of the catalyst 10 converges (convergence temperature) in the case where the internal combustion engine is operated at a certain intake air amount and a certain rotation speed. That is, the steady bed temperature is a temperature to which the bed temperature of the catalyst 10 converges in the case where the operating state is a steady state. The current bed temperature is, for example, obtained through smoothing on the basis of the convergence temperature. The current bed temperature is calculated for each of the plurality of regions in the catalyst 10, that is, each of the center portion and the front end portion. Each current bed temperature is a factor for acquiring the temperature state of the corresponding region.

The base increase value calculation unit 22 calculates a base increase value on the basis of the intake air amount and the rotation speed. The base increase value is a base amount of fuel that should be injected from the fuel injection valve 8. The base increase value is, for example, acquired in accordance with a map shown in FIG. 5. That is, the base increase value is acquired on the basis of an engine rotation speed and a load. The base increase value may be acquired for each of the front end portion and the center portion of the catalyst 10 shown in FIG. 3. The comparator 23 compares the convergence temperature, the current bed temperature and the OT determination temperature (determination value) with one another, and determines a magnitude correlation among those temperatures. In addition, the comparator 23 determines magnitude correlations in steps of the flowchart shown in FIG. 4.

The compensator 24 corrects the base increase value on the basis of the convergence temperature and the current bed temperature. The convergence temperature and the current bed temperature are acquired by the bed temperature acquisition unit 20. The base increase value is calculated by the base increase value calculation unit 22. Specifically, the compensator 24 corrects the base increase value using a correction coefficient, and acquires a corrected increase value. The target bed temperature is set to a value lower than the OT determination temperature (determination value). The correction coefficient is calculated in consideration of the target bed temperature.

The injection amount increasing unit 26 selects any one of the base increase value and the corrected increase value as a final OT increase value. The amount of fuel increased by the OT increase value determined by the injection amount increasing unit 26 is injected from the fuel injection valve. That is, the total of the OT increase value and an injection amount before the OT increase is injected from the fuel injection valve. The details will be described later.

As described above, the fuel injection unit 27 includes the base increase value calculation unit 22, the comparator 23, the compensator 24 and the injection amount increasing unit 26. The fuel injection unit 27 determines for each of the front end portion and the center portion whether an increase in fuel injection amount is required on the basis of information about a temperature state. The information about the temperature state is acquired by the bed temperature acquisition unit. The information about the temperature state is specifically a current bed temperature and a steady bed temperature. Furthermore, the fuel injection unit 27 calculates an increase value in fuel injection amount for each of the front end portion and the center portion. The fuel injection unit 27 injects fuel of an amount including the sum of the calculated increase values. The details will be described later.

Figure 4A:
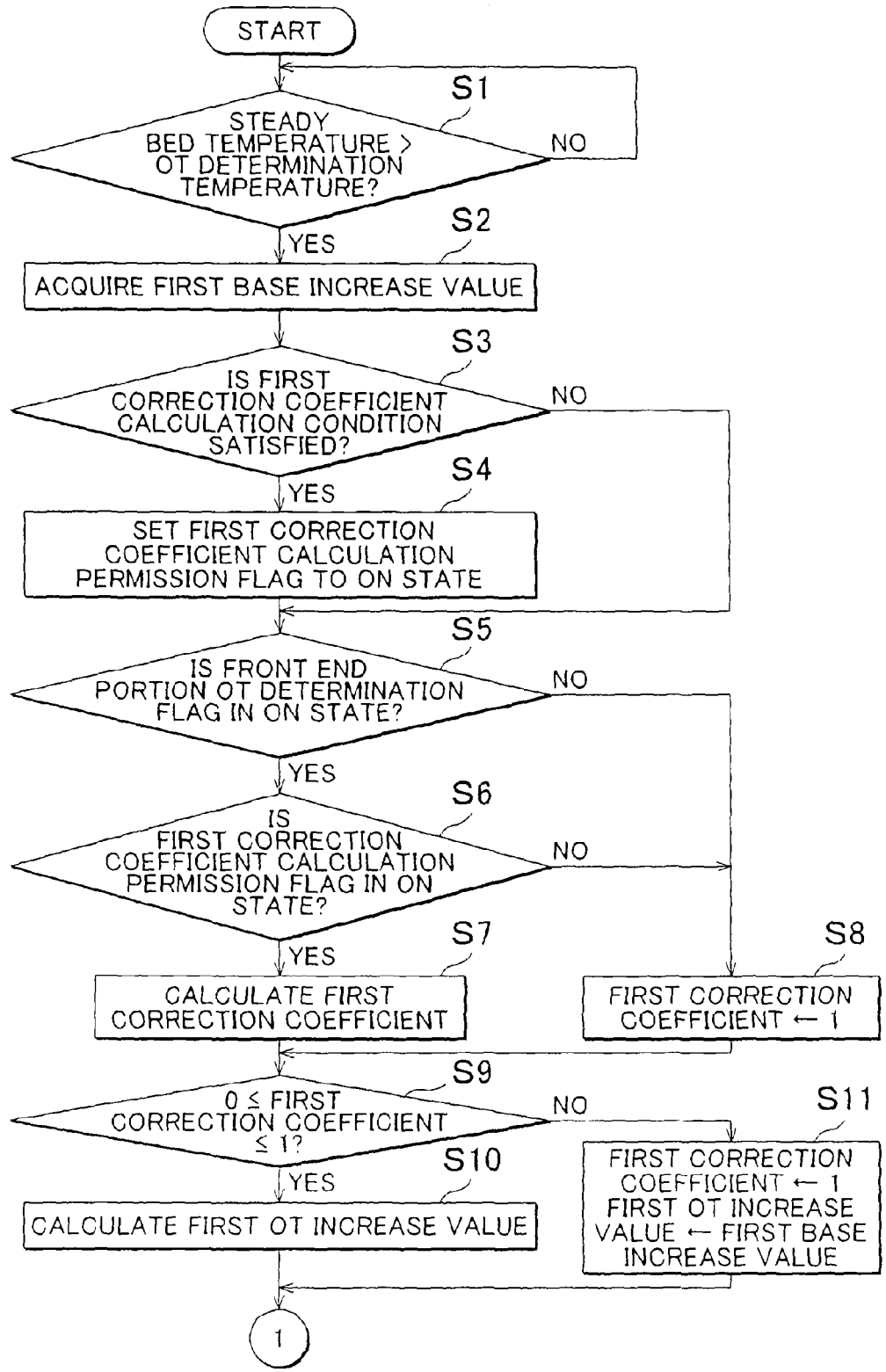
FIGS. 4A and 4B are a flowchart that shows an example of control over the catalyst protection device according to the embodiment.
Figure 5:
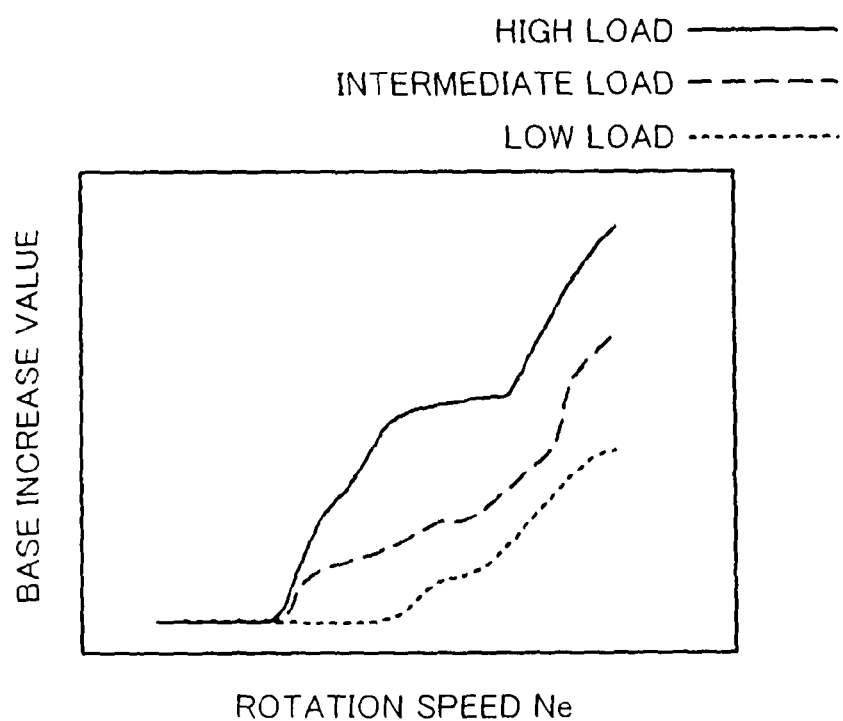
FIG. 5 is a view that shows an example of a map by which a base increase value is calculated on the basis of an engine rotation speed and an engine load.

Next, an example of control over the catalyst protection device according to the embodiment will be described with reference to the flowchart shown in FIG. 4A. Control over the catalyst protection device is mainly executed by the ECU 2. The ECU 2 stores the determination value for the front end portion and the determination value for the center portion. That is, the ECU 2 stores the front end portion OT determination temperature and the center portion OT determination temperature. The center portion OT determination temperature is lower than the front end portion OT determination temperature. Whether an increase in fuel injection amount is required for the front end portion is determined using the front end portion OT determination temperature. Whether an increase in fuel injection amount is required for the center portion is determined using the center portion OT determination temperature.

The temperature of the center portion may further increase due to, for example, propagation of heat from the front end portion. The value of the center portion OT determination temperature is set so as to be smaller than the front end portion OT determination temperature. Specifically, the center portion OT determination temperature is set to a value lower by the heat of oxidation $\alpha°$ C. of a catalyst material than the target bed temperature. At the center portion of the catalyst 10, for example, the bed temperature increases when fuel cut (F/C) is performed. For the center portion of the catalyst 10, the OT determination temperature is set in expectation of an increase in bed temperature at the time when F/C is performed.

Figure 6:
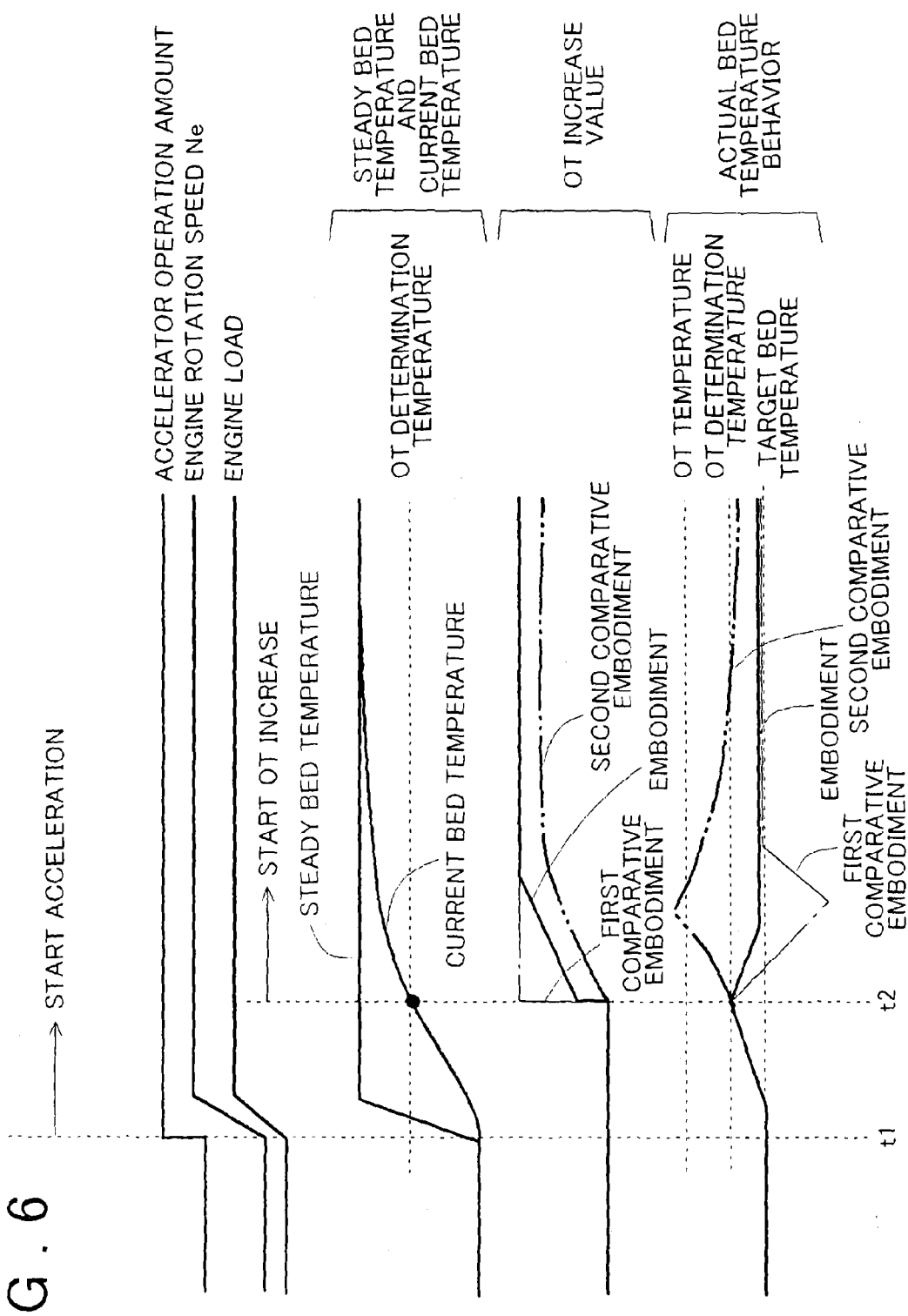
FIG. 6 is a time chart that shows an example of temporal variations in values in the catalyst protection device according to the embodiment.

Initially, in step S1, it is determined whether the convergence temperature is higher than the OT determination temperature. Specifically, it is determined whether the convergence temperature is higher than the front end portion OT determination temperature. This is because a state where the above condition is not satisfied is a state where OT increase control is not required. The process of step S1 is repeated until affirmative determination is made. The convergence temperature (steady bed temperature) rises in response to an increase in accelerator operation amount at time t1 as shown in FIG. 6. The current bed temperature approaches the steady bed temperature with a time lag.

When affirmative determination is made in step S1, the process proceeds to step S2. In step S2, a first base increase value is acquired. The first base increase value is acquired from the map illustrated in FIG. 5. That is, the first base increase value is acquired on the basis of the engine rotation speed and the engine load. Here, the first base increase value is a base increase value that takes into consideration the state of the front end portion of the catalyst 10 shown in FIG. 3.

In step S3 subsequent to step S2, it is determined whether a first correction coefficient calculation condition is satisfied. Here, a first correction coefficient is obtained on the basis of the current bed temperature and the target bed temperature. Specifically, the first correction coefficient is calculated by the following expression 1 for obtaining the ratio of a difference between the current bed temperature and the target bed temperature to a difference between the steady bed temperature and the target bed temperature. The first correction coefficient is a coefficient for reducing the first base increase value.

First correction coefficient=((Current bed temperature)−(Target bed temperature))/((Steady bed temperature)−(Target bed temperature))     Expression 1

The target bed temperature is set to a value lower than the OT determination temperature, and means a bed temperature to which the bed temperature converges at the time when an increase in the amount of injected fuel by the first base increase value is continued. In this way, the first correction coefficient is a coefficient obtained in consideration of the influence of introduction of the first base increase value. Thus, an excessive reduction in the base increase value is suppressed, and an excessive-temperature state is avoided.

In step S3, it is determined whether the first correction coefficient calculation condition is satisfied. Specifically, it is determined whether a calculation permission condition that (Current bed temperature)−(Target Temperature)≥0 and (Steady bed temperature)−(Target temperature)>0 is satisfied. This is because, when the calculation permission condition is not satisfied, a calculated value is not appropriate as a value for reducing the base increase value. When affirmative determination is made in step S3, the process proceeds to step S4. In step S4, a first correction coefficient calculation permission flag is set to an on state. Then, the process proceeds to step S5. On the other hand, when negative determination is made in step S3, the process skips step S4 and proceeds to step S5.

In step S5, it is determined whether a front end portion OT determination flag is in an on state. That is, it is determined whether the current bed temperature shown in FIG. 6 has increased and has exceeded the OT determination temperature. As shown in FIG. 6, at time t2, the current bed temperature exceeds the OT determination temperature. Therefore, the OT determination flag is set to an on state at time t2. When affirmative determination is made in step S5, the process proceeds to step S6. When negative determination is made in step S5, the process proceeds to step S8. Step S8 will be described later.

In step S6, it is determined whether the first correction coefficient calculation permission flag is in an on state. When the process has passed through step S4, affirmative determination is made. When affirmative determination is made in step S6, the process proceeds to step S7. In step S7, the first correction coefficient is calculated by the expression 1.

On the other hand, when negative determination is made in step S5 or step S6, the process proceeds to step S8. In step S8, "1" is employed as the first correction coefficient. This is a measure that is employed for the purpose of fail safe for an effective increase value. For example, when the first correction coefficient is larger than 1 due to various factors, the base increase value is further increased, and an excessive increase is performed. In order to avoid this situation, "1" is employed as the first correction coefficient. When "1" is employed as the first correction coefficient, the base increase value is directly output. Thus, the catalyst is cooled, and the catalyst is protected.

In step S9 subsequent to step S7 and step S8, it is determined whether the condition (0≤first correction coefficient≤1) is satisfied. When affirmative determination is made in step S9, the process proceeds to step S10. In step S10, a first OT increase value is calculated by the expression 2. The first OT increase value corresponds to the corrected increase value.

(First OT increase value)=(First correction coefficient)×(First base increase value)     Expression 2

On the other hand, when the first correction coefficient falls outside the range (0≤first correction coefficient≤1) and negative determination is made in step S9, the process proceeds to step S11. In step S11, "1" is set as the first correction coefficient. As a result, the first base increase value is calculated as the first OT increase value. For example, even when an accurate value is not calculated due to a control system of the device, an injection amount of the base increase value is ensured. Thus, the catalyst is protected.

Through the process to step S11, calculation of the OT increase value for the front end portion of the catalyst 10 has been completed.

Figure 7:
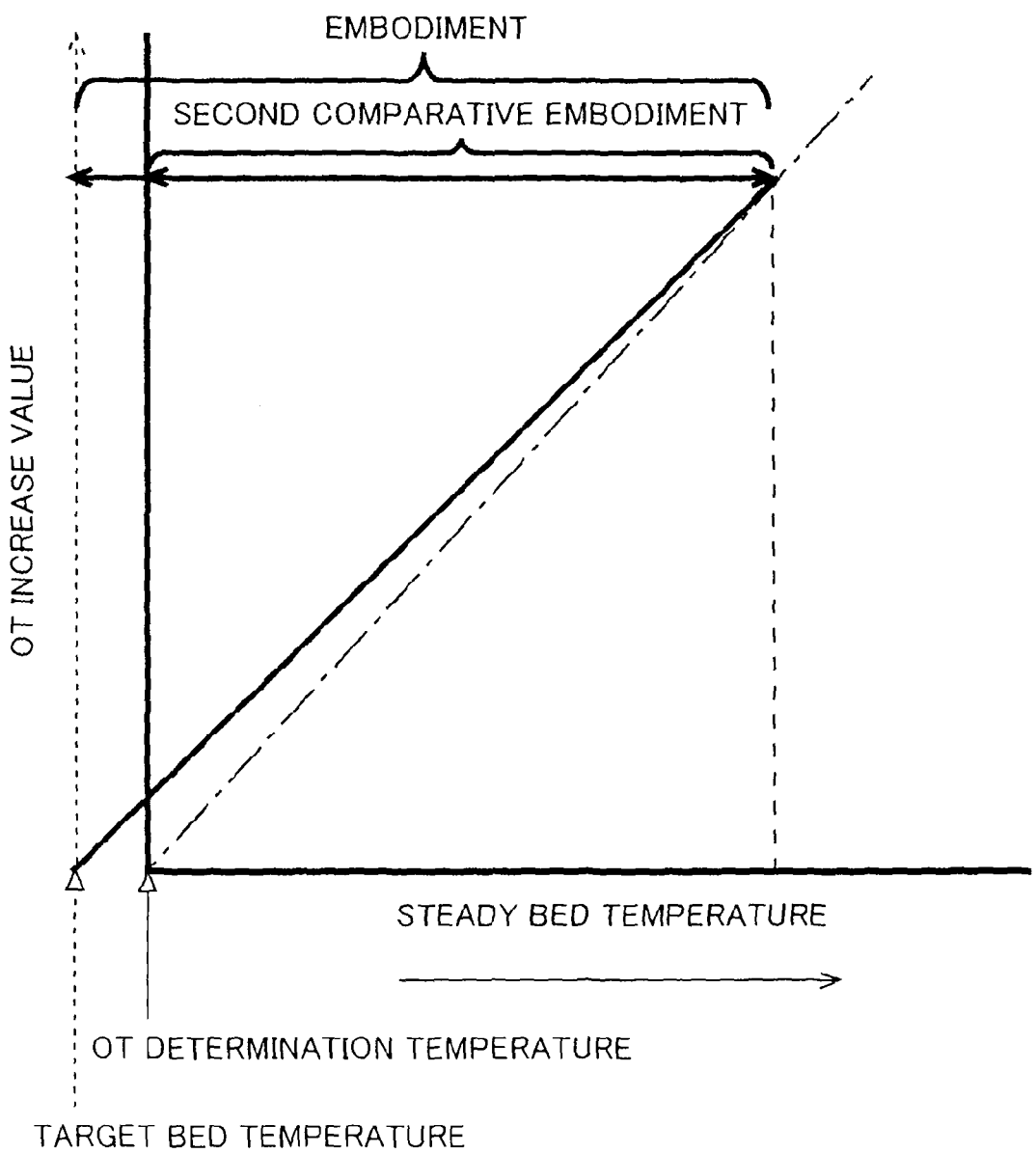
FIG. 7 is a view that illustrates the correlation between a convergence temperature and an OT increase value in the embodiment together with a comparative embodiment.
Figure 8:
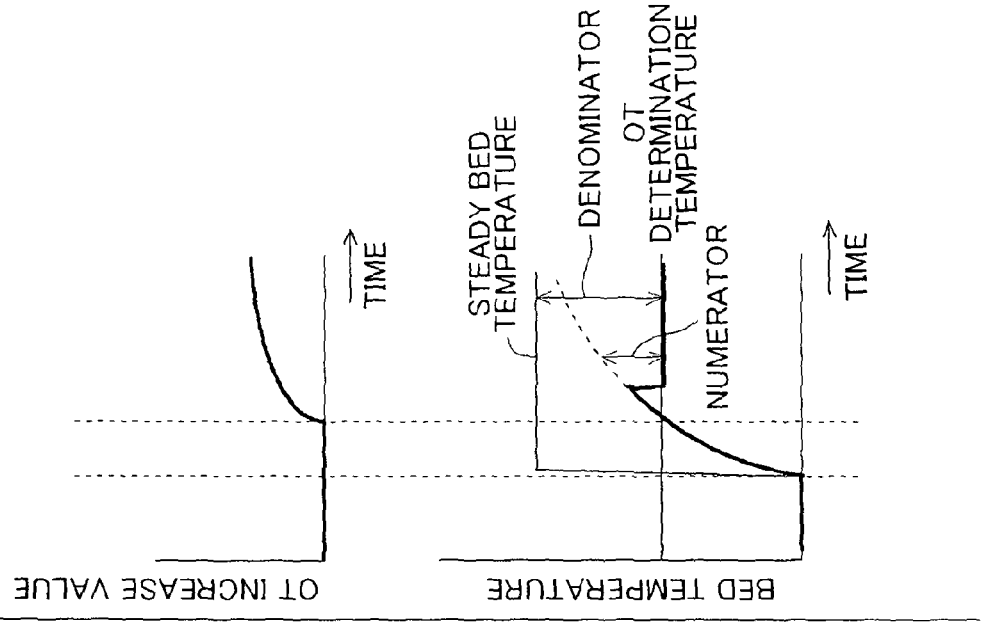
FIG. 8 is a view that illustrates the correlation between an OT increase value and a change in bed temperature in the embodiment together with a comparative embodiment.
Figure 8:
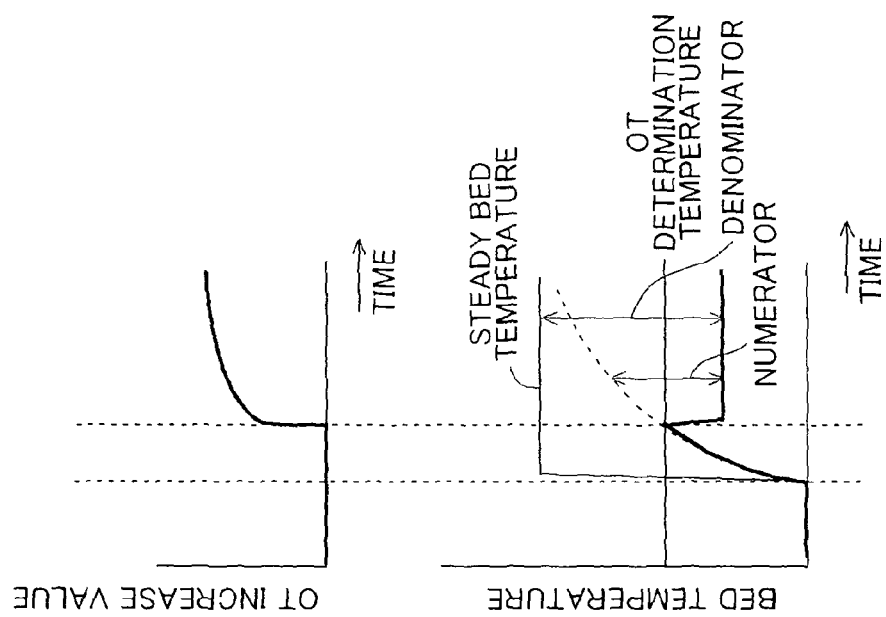

Here, the behavior of temperature in the case where fuel is injected using the first OT increase value calculated in step S10 as the final OT increase value will be described with reference to FIG. 6 to FIG. 8 together with comparative embodiments.

In FIG. 6, in a first comparative embodiment, fuel is injected by constantly using the base increase value. That is, no measure to reduce the base increase value is taken. In a second comparative embodiment, a correction coefficient is calculated using the expression 3.

Correction coefficient=((Current bed temperature)−(OT determination temperature))/((Convergence temperature)−(OT determination temperature)     Expression 3

In the first comparative embodiment, fuel is injected by constantly using the base increase value, so the injection amount may become excessive. As a result, an actual temperature may decrease more than necessary, and the amount of emission of CO may increase.

In the second comparative embodiment, the amount of reduction from the base increase value may become excessive, an increase in injection amount may be insufficient, and the bed temperature may rise over an OT temperature. This phenomenon will be described with reference to FIG. 7 and FIG. 8. In the second comparative embodiment, the correction coefficient that is calculated by the mathematical expression 3 is used. The OT determination temperature is incorporated into the Mathematical expression 3. Therefore, as shown in FIG. 7, cooling is insufficient, particularly, in an initial stage of increasing control, in which the temperature of the catalyst is low. As shown in FIG. 8, in the embodiment, immediately after the bed temperature has reached the OT determination temperature, the OT increase value rises substantially vertically. In contrast to this, in the second comparative embodiment, the OT increase value gradually increases, so the bed temperature may rise over the OT determination temperature.

In this way, in the catalyst protection device according to the embodiment, the target bed temperature lower than the OT determination temperature is used at the time when the correction coefficient is calculated, so it is possible to calculate an appropriate OT increase value.

Figure 4B:
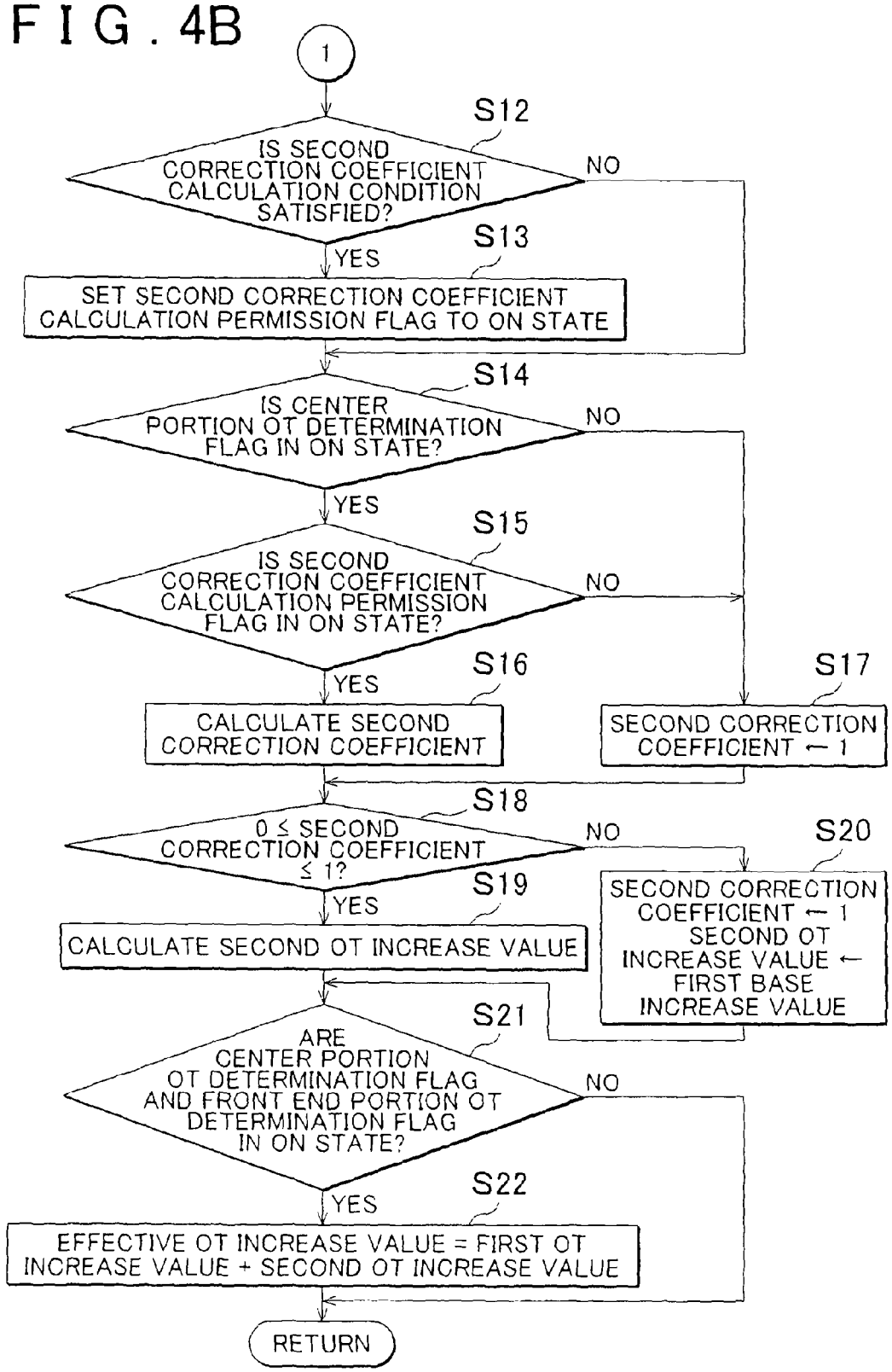
Figure 9:
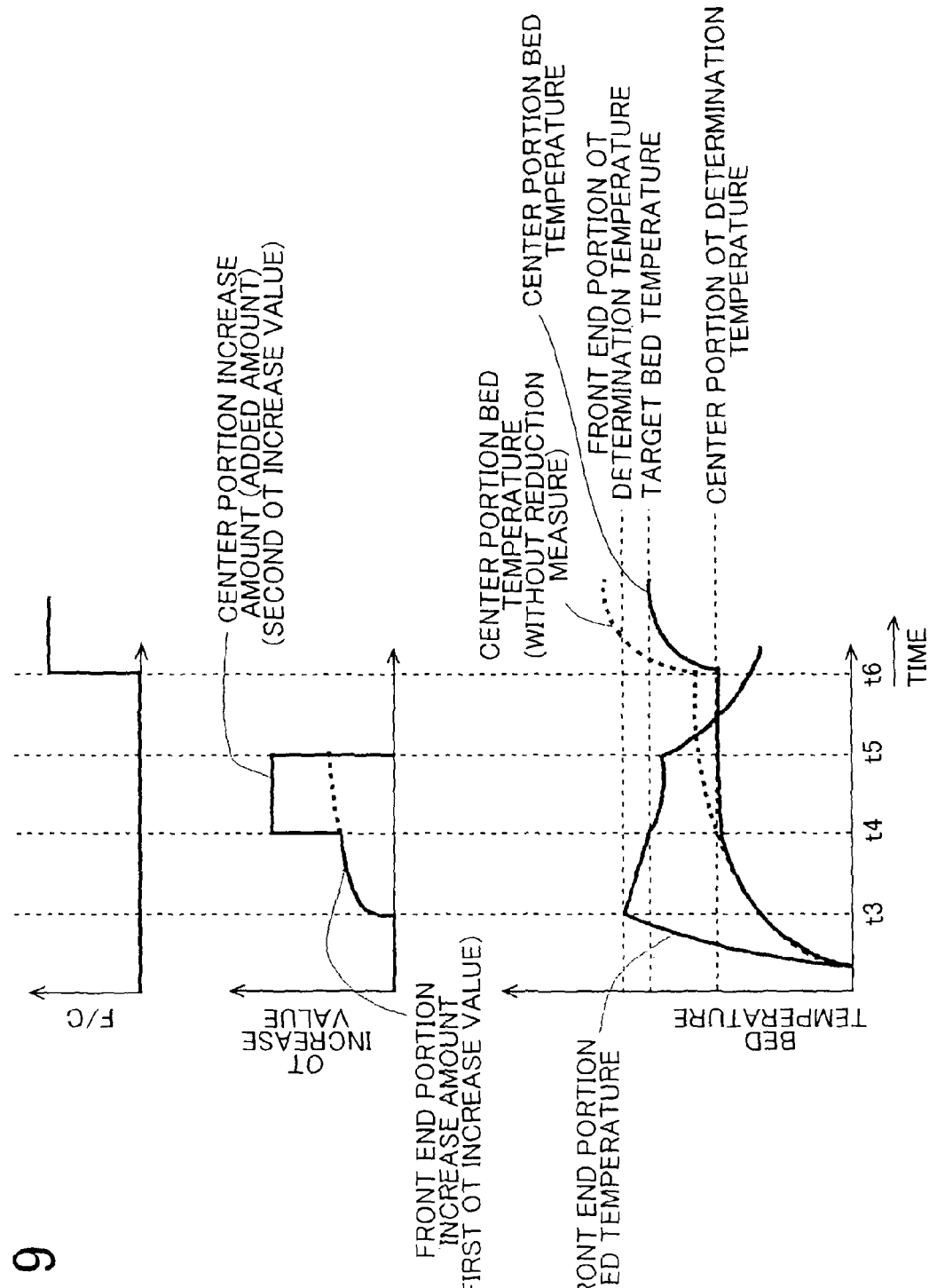
FIG. 9 is a view that illustrates the correlation among an OT increase value, a change in front end portion bed temperature and a change in center portion bed temperature.

Subsequently, the process from step S12 will be described with reference to the flowchart shown in FIG. 4B. Through the process from step S12 to step S20, the OT increase value for the center portion of the catalyst 10 is calculated. When the OT increase value for the center portion is calculated as well, the first base increase value is used as in the case where the OT increase value for the front end portion is calculated. As shown in FIG. 9, the amount of increase for the center portion of the catalyst 10 (second OT increase value) is finally added to the first OT increase value (step S30). The second OT increase value is, for example, calculated as a value for a steep rise in temperature in the case where F/C control is executed and the heat of the oxidation reaction of an oxygen storage capacity (OSC) agent is generated in the upstream region of the catalyst in the exhaust gas flow direction.

In step S12, it is determined whether a second correction coefficient calculation condition is satisfied. Here, a second correction coefficient is calculated by the following expression 4. The second correction coefficient is a coefficient for reducing the first base increase value.

Second correction coefficient=((Center portion current bed temperature)−(Center portion OT determination temperature))/((Steady bed temperature)−(Target bed temperature))     Expression 4

The target bed temperature is a value similar to that when the first correction coefficient is calculated, and is set to a value lower than the OT determination temperature. The target bed temperature means a bed temperature to which the bed temperature converges at the time when an increase in fuel injection by the first base increase value is continued. In this way, the first correction coefficient is a coefficient obtained in consideration of the influence of introduction of the first base increase value. Thus, an excessive reduction in the base increase value is suppressed. Therefore, an excessive-temperature state of the catalyst is avoided.

In order to obtain the center portion current bed temperature, a center portion current bed temperature calculation reference value shown in FIG. 10 is calculated. That is, a reference value for calculating the current bed temperature at the center portion is calculated. In the present embodiment, the front end portion OT determination temperature and the center portion OT determination temperature that are set for the respective regions, that is, the front end portion and the center portion, are used, and an increase value is calculated for each of the regions. The center portion current bed temperature calculation reference value is obtained by modifying the current bed temperature at the front end portion. Specifically, the center portion current bed temperature calculation reference value is obtained by limiting the current bed temperature to the front end portion OT determination temperature after the current bed temperature at the front end portion has reached the front end portion OT determination temperature. That is, the center portion current bed temperature calculation reference value is obtained by keeping the current bed temperature at the front end portion OT determination temperature after the current bed temperature at the front end portion has reached the front end portion OT determination temperature. The center portion current bed temperature is obtained by smoothing the center portion current bed temperature calculation reference value. In this way, the bed temperature at the center portion is acquired on the basis of the front end portion OT determination temperature that is the determination value set for the front end portion. That is, the center portion current bed temperature is defined on the basis of the front end portion OT determination temperature that is the determination value set for the front end portion. The reason why the center portion current bed temperature is defined in this way is as follows. That is, when OT determination is made at the front end portion and then OT increase for front end portion is performed, the current bed temperature of the front end portion decreases from the OT determination temperature toward the target bed temperature. However, it is difficult to acquire at how much rate the actual bed temperature converges toward the target bed temperature after the OT increase is carried out. Then, while an increase in injection amount is being performed, the center portion current bed temperature is defined by utilizing a value smoothed toward the front end portion OT determination temperature that is a high-temperature-side limit condition, and that is not permitted to be exceeded. Thus, it is possible to suppress damage to the catalyst 10 due to a situation that the reference region enters an over-temperature state.

As described above, the center portion OT determination temperature is set to a value lower by the heat of oxidation $\alpha°$ C. of the catalyst material than the target bed temperature. Thus, it is possible to cope with a steep increase in temperature at the time when F/C is performed.

In step S12, it is determined whether the above second correction coefficient calculation condition is satisfied. Specifically, it is determined whether the calculation permission condition that ((Center portion current bed temperature)−(Center portion OT determination temperature))$\geq 0$ and ((Steady bed temperature)−(Target bed temperature))>0 is satisfied. This is because, when the calculation permission condition is not satisfied, a calculated value is not appropriate as a value for reducing the base increase value. When affirmative determination is made in step S12, the process proceeds to step S13, and, in step S13, a second correction coefficient calculation permission flag is set to an on state. Then, the process proceeds to step S14. On the other hand, when negative determination is made in step S12, the process skips step S13 and proceeds to step S14.

In step S14, it is determined whether the center portion OT determination flag is in an on state. That is, it is determined whether the center portion current bed temperature shown in FIG. 10 has exceeded the OT determination temperature. When affirmative determination is made in step S14, the process proceeds to step S15. When negative determination is made in step S14, the process proceeds to step S17. Step S17 will be described later.

In step S15, it is determined whether the second correction coefficient calculation permission flag is in an on state. When the process has passed through step S13, affirmative determination is made. When affirmative determination is made in step S15, the process proceeds to step S16. In step S16, the second correction coefficient is calculated by the expression 4.

On the other hand, when negative determination is made in step S14 or step S15, the process proceeds to step S17. In step S17, "1" is employed as the second correction coefficient. This is a measure that is employed for the purpose of fail safe for an effective increase value. For example, when the second correction coefficient is larger than 1 due to various factors, the base increase value is further increased, and an excessive increase is performed. In order to avoid such an excessive increase, "1" is employed as the second correction coefficient. When "1" is employed as the second correction coefficient, the base increase value is directly output. Thus, the catalyst is cooled, and the catalyst is protected.

In step S18 subsequent to step S16 and step S17, it is determined whether the condition (0≤second correction coefficient≤1) is satisfied. When affirmative determination is made in step S18, the process proceeds to step S19. In step S19, the second OT increase value is calculated by the expression 5. The second OT increase value corresponds to the corrected increase value.

(Second OT increase value(=(Second correction coefficient)×(First base increase value)    Expression 5

On the other hand, when the second correction coefficient falls outside the range (0≤second correction coefficient≤1) and negative determination is made in step S18, the process proceeds to step S20. In step S20, "1" is set as the second correction coefficient. As a result, the first base increase value is calculated as the second OT increase value. For example, even when an accurate value is not calculated due to a control system of the device, an injection amount of the base increase value is ensured. Thus, the catalyst is protected.

Through the process from step S12 to step S20, calculation of the OT increase value for the center portion of the catalyst 10 has been completed.

In step S21, it is determined whether the center portion OT determination flag is in an on state and the front end portion OT determination flag is in an on state. When affirmative determination is made in step S21, the process proceeds to step S22. In step S22, the final effective OT increase value is obtained by adding the second OT increase value calculated in step S19 to the first OT increase value calculated in step S10. On the other hand, when negative determination is made in step S21, the process is returned. That is, an increase value for the center portion of the catalyst 10 is added to the effective OA increase value only when both the center portion OT determination flag and the front end portion OT determination flag are in an on state.

The center portion of the catalyst 10 is located downstream of the front end portion in the exhaust gas flow direction. Therefore, when the bed temperature of the front end portion has not reached the OT determination temperature, the bed temperature of the center portion does not increase immediately. An OT increase in such a case results in useless fuel injection, and may influence, for example, a deviation from a range in which the excess air fuel ratio λ=1 at the Stoichiometric air-fuel ratio. Then, an increase value is added only when both the center portion OT determination flag and the front end portion OT determination flag are in an on state.

In this way, an increase value is calculated for each of the plurality of regions in the catalyst distributed into the plurality of regions in the exhaust gas flow direction, and fuel of an amount including the sum of the increase values is injected. In the catalyst distributed into the plurality of regions in the exhaust gas flow direction, an increase value is calculated for each region, and fuel of an amount including the sum of the calculated values is injected. Thus, it is possible to perform appropriate OT increase in accordance with an actual temperature distribution in the catalyst.

The embodiment of the invention is described in detail above; however, the invention is not limited to the above example embodiment. Various alterations or modifications are applicable within the scope of the invention recited in the appended claims.

For example, in the above-described embodiment, an increase value of fuel may be corrected; however, correction of the increase value is not indispensable. The increase values may be calculated for a plurality of regions of the catalyst, distributed in the exhaust gas flow direction, whereby fuels are injected accordingly, just needs to be injected.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A catalyst protection device for an internal combustion engine, comprising:
   a catalyst that purifies exhaust gas;
   a bed temperature acquisition unit configured to acquire a bed temperature of the catalyst for each of a plurality of regions of the catalyst in an exhaust gas flow direction; and
   a fuel injection unit configured to, when it is determined that an increase in fuel injection amount is required for each of the regions on the basis of the corresponding bed temperatures, inject fuel of an amount including a sum of increase values required for the respective regions.

2. The catalyst protection device according to claim 1, wherein
   on the basis of determination as to whether an increase in fuel injection amount is required for a preset reference region and determination as to whether an increase in fuel injection amount is required for a region upstream of the reference region in the exhaust gas flow direction among the plurality of regions, the fuel injection unit is configured to add an increase value for the reference region to an increase value for the region upstream of the reference region in the exhaust gas flow direction.

3. The catalyst protection device according to claim 1, wherein
   when it is determined that an increase in fuel injection amount is required for both the reference region and an adjacent region upstream of the reference region in the exhaust gas flow direction, the fuel injection unit is configured to add an increase value for the reference region to an increase value for the adjacent region upstream of the reference region in the exhaust gas flow direction.

4. The catalyst protection device according to claim 1, wherein
   when the bed temperature acquisition unit sets a determination value for each of the plurality of regions and then calculates the increase value for the reference region and the increase value for the region upstream of the reference region in the exhaust gas flow direction using the determination values respectively set for the regions, the bed temperature acquisition unit is configured to acquire the bed temperature in the reference region on the basis of the determination value set for the region upstream of the reference region in the exhaust gas flow direction.

5. The catalyst protection device according to claim 1, wherein
   the fuel injection unit sets a value, as a determination value for the reference region among the plurality of regions, smaller than a determination value set for a region upstream of a reference region in the exhaust gas flow direction, and determines for each of the regions whether an increase in fuel injection amount is required by comparing a current value of the bed temperature for each of the regions with the determination value set for each of the regions.

6. A catalyst protection method for an internal combustion engine, comprising:

acquiring a bed temperature of a catalyst, which purifies exhaust gas, for each of a plurality of regions of the catalyst in an exhaust gas flow direction;

after acquiring the bed temperature for each of the regions, determining for each of the plurality of regions whether an increase in fuel injection amount is required on the basis of the corresponding bed temperature; and after the determination, when it is determined that an increase in fuel injection amount is required for each of the regions, injecting fuel of an amount including the sum of increase values required for the respective regions.

* * * * *